US006448322B1

(12) United States Patent
Yeh et al.

(10) Patent No.: US 6,448,322 B1
(45) Date of Patent: Sep. 10, 2002

(54) STABILIZATION OF HALOGENATED RUBBER

(75) Inventors: Richard C. Yeh; David Yen-Lung Chung, both of Bellaire; Chia Shian Chee, Houston, all of TX (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/382,962

(22) Filed: Aug. 25, 1999

Related U.S. Application Data

(63) Continuation-in-part of application No. 08/811,795, filed on Mar. 6, 1997, now abandoned.

(51) Int. Cl.$^7$ ................................................ C08K 3/00
(52) U.S. Cl. ...................................... 524/424; 524/425
(58) Field of Search .............................. 524/424, 425, 524/252, 257; 521/92, 907; 525/333

(56) References Cited

U.S. PATENT DOCUMENTS

| | | | |
|---|---|---|---|
| 2,075,251 A | | 3/1937 | Winkelmann |
| 2,333,280 A | * | 11/1943 | Tucker .................... 524/436 |
| 2,365,400 A | * | 12/1944 | Fikenscher .................. 524/436 |
| 2,365,506 A | * | 12/1944 | Alexander et al. .......... 524/424 |
| 2,507,142 A | | 5/1950 | Chaban |
| 2,557,474 A | * | 6/1951 | Sanderson ................. 524/424 |
| 3,117,109 A | * | 1/1964 | Glathe et al. ............. 260/85.1 |
| 3,242,148 A | | 3/1966 | Kinchen, et al. |
| 3,801,517 A | * | 4/1974 | Richwine .................... 524/399 |
| 4,104,218 A | * | 8/1978 | Hous .......................... 524/399 |
| 4,130,519 A | | 12/1978 | Roper et al. |
| 4,384,072 A | | 5/1983 | Newman et al. |
| 4,486,575 A | | 12/1984 | Newman et al. |
| 4,501,859 A | | 2/1985 | Newman et al. |
| 4,513,116 A | | 4/1985 | Kowalski et al. |
| 4,517,335 A | | 5/1985 | Wolff et al. |
| 4,558,102 A | * | 12/1985 | Miyata ....................... 524/428 |
| 5,013,793 A | * | 5/1991 | Wang et al. |
| 5,077,345 A | | 12/1991 | Newman et al. |
| 5,087,674 A | | 2/1992 | Gardner et al. |
| 5,162,409 A | | 11/1992 | Mroczkowski |
| 5,286,804 A | | 2/1994 | Powers et al. |
| 5,312,859 A | * | 5/1994 | Preston et al. .............. 524/436 |
| 5,360,859 A | * | 11/1994 | Ogawa et al. ............... 524/424 |
| 5,376,438 A | | 12/1994 | Costemalle et al. |
| 5,430,118 A | * | 7/1995 | Powers et al. ........... 525/333.4 |
| 5,698,640 A | * | 12/1997 | Duydevani et al. ...... 525/333.4 |

FOREIGN PATENT DOCUMENTS

WO    WO 98/39380    9/1998

\* cited by examiner

*Primary Examiner*—Veronica P. Hoke
(74) *Attorney, Agent, or Firm*—Joseph F. Reidy; Kevin M. Faulkner

(57) ABSTRACT

Halogenated isobutylene-p-methylstyrene polymers are stabilized against discoloration with a weak base such as 100 to 500 ppm sodium bicarbonate. The additive is added to the rubbery polymers after dewatering in the finishing step of their manufacture. The curability of the stabilized rubbers is not adversely affected by the sodium bicarbonate additive.

32 Claims, No Drawings

STABILIZATION OF HALOGENATED RUBBER

The present application is a continuation in part of U.S.S.N. 08/811795 filed Mar. 6, 1997, now abandoned.

FIELD OF THE INVENTION

This invention relates to stabilizing halogenated isobutylene-p-methylstyrene copolymers from discoloration, with a minor amount of a weak base. More specifically, the invention relates to preventing discoloration of polymer under process and storage conditions.

BACKGROUND OF THE INVENTION

Halogenated rubbers are generally prepared by halogenating a rubbery polymer such as isobutylene-isoprene copolymer or isobutylene-p-methylstyrene copolymer in an organic solvent. This produces a halogenated polymer solution containing hydrogen halide as a byproduct. The halide is typically neutralized with an aqueous base and the resulting mixture is washed and precipitated in water to obtain a neutralized halogenated polymer in the form of a wet crumb, typically containing about 50 percent by weight water. The wet crumb is then dewatered in a dewatering extruder, press, mill, dryer or the like to obtain a dewatered crumb usually less than about 10–20 weight percent water. The dewatered crumb is then finished in an extruder or its equivalent with any other additives such as antioxidants, UV stabilizers or the like to obtain a relatively dry halogenated rubber product which is typically pressed into bales for storage and shipment.

Typically, about 1–1.5 weight percent of an additive such as epoxidized soybean oil (ESBO) has been added to the halobutyl polymers during the finishing stage to prevent dehalogenation and discoloration during storage. However, ESBO is relatively expensive and tends to make the halobutyl polymers more tacky and slippery in drying extruder and adversely affect their the cure properties.

Owing to the higher stability of the brominated isobutylene-p-methylstyrene copolymers available under the trade designation EXXPRO™, and the undesirability of additives such as ESBO, additives such as ESBO are typically not used in the EXXPRO™ polymers. However, there are occasionally noted instances of orange discoloration of the EXXPRO™ polymers. This discoloration is the result of minute amounts of iron bromide present in the dried rubber. The discoloration is not present in the wet rubber. The discoloration is reversible as the rubber is made dry or wet.

The thermal instability of most halogenated polymers such as halobutyl and PVC usually starts with deydrohalogenation and usually results in discoloration, reduction of MW and halogen content, some loss of and physical properties. However, the benzyl bromide of the brominated isobutylene-p-methylstyrene copolymers (BrIBMS) does not have a mechanism available to undergo dehydrohalogenation reactions and the observed orange discoloration does not accompany by any MW degradation, bromine loss or physical property change. Consequently, the observed orange discoloration in BrIBMS is not due to dehydrohalogenation as other halogenated polymers. Also the orange discoloration of BrIBMS appears as isolated spots or strips and only occurs in dry polymer during storage. Consequently it is not obvious that the polymer stabilization techniques developed for halobutyl polymers and other halogenated polymers such as PVC in prior arts can prevent the orange discoloration in EXXPRO™.

One way to minimize dehydrohalogenation of halogenated polymers is to use large excess of caustic (NaOH) during neutralization step to neutralize all HBr/HCl by-products from halogenation. This approach did not eliminate the orange spotting and striping of BrIBMS.

Other common approaches are to add acid scavenger, base or other additive/stabilizer during halogenation or neutralization steps. Examples are:

ESBO is commonly added to halobutyl polymers during finishing, but ESBO is expensive and tends to affect drying extruder operation and cure properties.

Roper et. al. (U.S. Pat. No. 4,130,519) teach the use of Ca Stearate (a metal carboxyate) prior to or during halogenation to minimize MW degradation and discoloration of halobutyl polymers resulting from dehydrohalogenation.

Gardiner et. al. (U.S. Pat. No. 5,087,674) describe the use of acid scavengers such as metal oxides, hydroxides and carboxylates in halobutyl polymers prior to or during halogenation step.

Powers et. al. (U.S. Pat. No. 5,286,804) teach the use of wetting agents (such as Ca Stearate) prior to neutralization step to improve the neutralization efficiency of brominated star-branch butyl polymers.

Chaban et. al. (U.S. Pat. No. 2,507,142) describe the use of chemical complexes of inorganic peroxide and metal salts, such as Na and Mg salts of perboric acid, to minimize the MW degradation and discoloration of PVC and other halogenated polymers resulting from dehydrohalogenation. Generally the presence of peroxide is very undesirable because it can react with benzylic bromide on BRIBMS (thus reduces the functional groups available for cure) as well as the backbone and cause MW degradation.

Accordingly, there remains a need to solve the discoloration of the dried EXXPRO™ polymers, due to the presence of minute amounts of iron bromide and to find less expensive additives for the halobutyl polymers which do not affect the tackiness or green strength of the halobutyl polymers.

SUMMARY OF THE INVENTION

This inventions is directed toward a method to prevent orange discoloration due to the presence of minute amounts of iron bromide in BrIBMS polymers by adding 100–500 ppm of a weak base such as $NaHCO_3$ as dry powder during the final drying step (add to the final drying extruder). All above cited prior arts (except Chaban's patent) require the addition of various metal salt additives at either halogenation step or neutralization step where large excess of strong base (NaOH) is present, but that does not prevent the orange discoloration of EXXPRO polymers during storage.

It has been found that halogenated rubber can be effectively stabilized with a small amount of a weak base, preferably $NaHCO_3$ without adversely affecting the curability, tackiness or green strength of the halogenated rubber. By adding the weak base, during the finishing stage, a stabilized halogenated rubber can be obtained which is free from orange spotting and striping and has virtually no adverse change in physical or vulcanizable characteristics.

In one aspect, the present invention provides an improvement in a method for making BrIBMS. The method includes the steps of halogenating preferably brominating a rubbery polymer in an organic solution to form a solution of halogenated rubber and hydrogen halide, neutralizing the hydrogen halide solution with an aqueous alkaline material, stripping the solvent from the neutralized solution to form a wet halogenated rubber crumb, dewatering the crumb to less than about 10–20 weight percent water, and finishing the crumb with one or more stabilizing additives to obtain a halogenated rubber product. The improvement is that the stabilizing additives in the finishing step include from 15 to 10,000 ppm of a weak metal base, preferably an alkali or alkaline earth metal base and most preferably $NaHCO_3$.

In another aspect, the present invention provides a dry, intimate admixture of halogenated rubber and a stabilizing amount less than 1 weight percent of the weak base.

In a further aspect, the present invention provides an intimate admixture of brominated isobutylene-p-methylstyrene copolymer and 15 to 10,000 ppm of a weak base preferably $NaHCO_3$ comprising less than 1 wieght percent water, preferably less than 0.3 weight percent water.

DETAILED DESCRIPTION OF THE INVENTION

The halogenation of rubbery polymers is well known from, for example, U.S. Pat No. 4,384,072 to Newman et al.; U.S. Pat No. 4,486,575 to Newman et al.; U.S. Pat No. 4,501,859 to Newman et al.; U.S. Pat No. 5,077,345 to Newman et al; U.S. Pat No. 5,286,804 to Powers et al.; U.S. Pat No. 5,087,674 to Gardner et al.; and U.S. Pat No. 4,513,116 to Kowalski et al.; all of which are incorporated herein by reference. The halogenated rubbers according to the present invention include halogenated IBMS preferably brominated isobutylene-p-methylstyrene copolymers.

The base which is added as a stabilizing additive is a weak base, i.e. a base having pK greater than 1, preferably greater than 6. Weak metal bases such as alkali and alkaline earth metal hydroxides, bicarbonates and carbonates are especially preferred. Sodium bicarbonate is exemplary of the preferred weak alkali metal bases.

The base is used in an amount effective to stabilize the halogenated rubber, usually at least 100 ppm, preferably at least 50 ppm, but can be as low as 15 ppm of the rubber. To prevent discoloration of the halogenated rubbers, there is no particular upper limit of the amount of the base which may be used but it will generally be desirable to use 10,000 ppm or less to avoid adversely effecting the physical and chemical properties of the halogenated rubber such as curability, tackiness and green strength. Curable halogenated rubbers preferably contain less than 10,000 ppm of the base additive, more preferably less than 1,000 ppm, and especially less than 500 ppm. In a preferred embodiment, the stabilizing additive is sodium bicarbonate at a level of 100–500 ppm by weight of the halogenated rubber.

The weak base additive is added to the halogenated IBMS in the manufacturing process after the halogenated rubber has been dewatered, preferably to less than 20 percent water by weight, more preferably to less than 10 percent water by weight. The additive is added during the finishing operation in which the dewatered halogenated rubber is further dried to, for example, less than 0.3 weight percent water, in a finishing extruder, mill, dryer or the like.

The additive is generally added in the form of a concentrated solution, for example, a 10 weight percent aqueous sodium bicarbonate solution. The additive could be added in the form of a dry powder, but this is generally more difficult to meter into the polymer. The additive should be added to the polymer after it is dewatered to avoid removing the additive when additional water is removed. Any water that is included in the additive solution is generally removed in the finishing extruder. Generally, the finished polymer contains less than 1 weight percent water, preferably less than 0.3 weight percent water. It is only necessary that the additive be intimately mixed with the polymer, in the finishing extruder.

The invention is illustrated by way of the following examples.

EXAMPLE 1
Effect of $NaHCO_3$ on Discolored EXXPRO™ Polymer

This example describes the initial discovery of the effect of $NaHCO_3$ (sodium bicarbonate) and other bases on discolored BrIBMS polymers. In this experiment, 40 grams of discolored (orange) BrIBMS polymer (MDX 90-10) was milled in a Brabender mixer at around 180° C. and 0.06 grams $NaHCO_3$ powder was added to the polymer melt and milling was continued for another 15 minutes. The polymer was then removed from the Brabender mixer and cooled to room temperature for inspection. It was observed that the orange discoloration was completely eliminated.

Similar results were observed via mixing of 200–1000 ppm of $NaHCO_3$ and discolored BrIBMS polymer (MDX 90-10) in a small laboratory Haake extruder at around 200° C. Both experiments indicated that addition of $NaHCO_3$ or other weak bases can eliminate the discoloration of EXXPRO™ polymers.

EXAMPLE 2
Adding 200 ppm $NaHCO_3$ to EXXPRO™ Polymer

This example describes the addition of 200 ppm $NaHCO_3$ into the BrIBMS polymer and the impact on polymer vulcanization. During the normal production of an BrIBMS polymer, (MDX 43-5) containing about 0.49 mole percent benzylic bromine (about 0.9 wt % bromine), solid $NaHCO_3$ powder was added via a solid feeder to the polymer crumbs at about 200 ppm, based on polymer feed rate, just before the polymer hopper of the drying extruder. The finished polymer was then compounded with a standard recipe (100 phr polymer, 40 phr IRB #6 carbon black, 2 phr stearic acid, 1 phr zinc oxide and 1 phr zinc stearate). The compounded polymer was tested side-by-side with the control sample without $NaHCO_3$ in a standard Monsanto Rheometer ODR 2000E (160° C., 60 minutes, 3° arc) to evaluate the effect of 200 ppm $NaHCO_3$ on cure.

The results are shown in the Table 1 below:

TABLE 1

| Sample (MDX 93-5) | ML (dNm) | MH (dNm) | Ts2 (min) | T25 (min) | T50 (min) | T90 (min) |
|---|---|---|---|---|---|---|
| Control (No $NaHCO_3$) | 12.43 | 35.38 | 5.65 | 8.44 | 15.21 | 27.61 |
| 180 ppm $NaHCO_3$ | 12.13 | 34.82 | 6.07 | 8.76 | 16.32 | 29.10 |
| 220 ppm $NaHCO_3$ | 12.53 | 35.84 | 6.88 | 10.05 | 17.10 | 30.69 |

The data indicate that the presence of 200 PPM $NaHCO_3$ tends to slow down the cure rate of BrIBMS polymer slightly, but the impact on final cure state of BrIBMS polymer is insignificant. No discoloration was observed in the uncured polymer containing 200 ppm $NaHCO_3$ even after 18 months storage in the warehouse. This example confirms that the presence of 200 ppm level $NaHCO_3$ can effectively prevent the orange discoloration of BrIBMS polymer.

EXAMPLE 3
Adding 500 ppm $NaHCO_3$ to EXXPRO™ Polymer

A similar experiment was carried out as Example 2 except that MDX 90-10 BrIBMS polymer (contains 2 wt % bromine on polymer) and 500 ppm $NaHCO_3$ was added to the polymer crumbs instead of 200 ppm NaHCO$_3$ as in Example 2. Similar evaluation on the effect of NaHCO$_3$ on cure versus a control sample without NaHCO$_3$ addition was carried out using the same recipe and test conditions. The evaluation results are shown in Table 2 below

TABLE 2

| Sample (MDX90-10) | ML (dNm) | MH (dNm) | Ts2 (min) | T25 (min) | T50 (min) | T90 (min) |
|---|---|---|---|---|---|---|
| Control (No NaHCO$_3$) | 18.29 | 90.08 | 2.55 | 5.01 | 5.82 | 10.75 |
| 500 ppm NaHCO$_3$ | 17.10 | 90.83 | 2.27 | 5.19 | 6.06 | 12.00 |

Again, the presence of 500 ppm NaHCO$_3$ has minimum impact on the cure rate and the final cure state of the BrIBMS polymer. No discoloration in the uncured polymer was observed even after 18 months of storage.

EXAMPLE 4
Adding 300 ppm DHT to EXXPRO™ Polymer

Another experiment was carried out via similar conditions as Example 2 except that about 300 ppm of a different weak base, namely DHT (magnesium aluminum hydroxycarbonate), was used. Similar evaluation on the impact of DHT on cure versus the control sample without DHT was carried out using the same recipe and test conditions. The evaluation results are shown in Table 3 below.

TABLE 3

| Sample (MDX 93-5) | ML (dNm) | MH (dNm) | Ts2 (min) | T90 (min) |
|---|---|---|---|---|
| Control (No NaHCO$_3$) | 14.72 | 35.55 | 4.69 | 26.17 |
| 300 ppm DHT | 15.12 | 35.02 | 5.52 | 26.46 |

Similar to NaHCO$_3$, the presence of 300 ppm level DHT tends to retard the cure rate of BrIBMS polymer with minimum impact on the final cure state of the polymer. Again, no discoloration in the uncured polymer was observed even after 18 months of storage The invention is illustrated by way of the foregoing description which is intended to represent exemplary embodiments only, and not to limit the invention. Numerous changes and modifications will occur to those skilled in the art in view of the foregoing description. It is intended that all such variations and modifications within the scope and content of the appended claims be embraced thereby.

We claim:

1. THe product of combining a halogenated isobutylene-p-methylstyrene polymer and less than 1 weight percent of a base selected from the group of an alkali or alkaline earth metal bicarbonate.

2. The product of claim 1, wherein the base comprises less than 1 weight percent water.

3. The product of claim 1, wherein the halogenated polymer is isobutylene-co-methylstyrene-bromomethylstyrene terpolymer.

4. The product of claim 1, comprising 50 to 500 ppm sodium bicarbonate based on the weight of the polymer.

5. The product of claim 1, comprising 100 to 500 ppm sodium bicarbonate based on the weight of the polymer.

6. An admixture of halogenated isobutylene-p-methylstyrene polymer and less than 1 weight percent of a base having a pK value of greater than 6.

7. The admixture of claim 6, comprising less than 1 weight percent water.

8. The admixture of claim 6, wherein the base is selected from an alkali or alkaline earth metal bicarbonate.

9. The admixture of claim 6, wherein the base is NaCHO$_3$.

10. The admixture of claim 6, wherein the halogenated polymer is isobutylene-co-methylstyrene-bromomethylstyrene terpolymer.

11. The admixture of claim 6, wherein the base is present from 15 to 1,000 ppm based on the weight of the polymer.

12. The admixture of claim 6, wherein the base is present from 100 to 500 ppm based on the weight of the polymer.

13. The product of combining an admixture of halogenated isobutylene-p-methylstyrene polymer and less than 1 weight percent of a base having a pK value of greater than 6.

14. The product of claim 13, comprising less than 1 weight percent water.

15. The product of claim 13, wherein the halogenated polymer is isobutylene-co-methylstyrene-bromomethylstyrene terpolymer.

16. The product of claim 13, wherein the base is present from 15 to 1,000 ppm based on the weight of the polymer.

17. The product of claim 13, wherein the base is present from 100 to 500 ppm based on the weight of the polymer.

18. An admixture of halogenated isobutylene-p-methylstyrene polymer and less than 1 weight percent of a base selected from the group comprising an alkali or alkaline earth metal bicarbonates.

19. The admixture of claim 18, wherein the base comprises less than 1 weight percent water.

20. The admixture of claim 18, wherein the halogenated polymer is isobutylene-co-methylstyrene-bromomethylstyrene terpolymer.

21. The admixture of claim 18, comprising 50 to 1,000 ppm alkali metal bicarbonate based on the weight of the polymer.

22. The admixture of claim 18, comprising 100 to 500 ppm sodium bicarbonate based on the weight of the polymer.

23. A mixture of brominated isobutylene-p-methylstyrene polymer and from 15 to 10,000 ppm based on the weight of the polymer of an alkali metal bicarbonate comprising less than 1 weight percent water.

24. The mixture of claim 23, comprising 50 to 1,000 ppm alkali metal bicarbonate.

25. The mixture of claim 24, wherein the alkali metal bicarbonate is 100 to 500 ppm sodium bicarbonate.

26. A method for making halogenated isobutylene-p-methylstyrene rubber comprising the steps of halogenating the rubber in an organic solution to form a solution of halogenated rubber and hydrogen halide, neutralizing the hydrogen halide solution with an aqueous alkaline material, stripping the solvent from the neutralized solution to form a wet halogenated rubber crumb, dewatering the crumb to less than 20 weight percent water, and finishing the crumb with one or more stabilizing additives to obtain a halogenated isobutylene-p-methylstyrene product, wherein the stabilizing additives in the finishing step consists essentially of from 15 to 10,000 ppm based on the weight of the rubber of an alkali metal bicarbonate.

27. The method of claim 26, wherein the stabilizing additives consists essentially of 50 to 1,000 ppm alkali bicarbonate.

28. The method of claim 26, wherein the stabilizing additive consists essentially of from 100 to 500 ppm of the alkali metal bicarbonate.

29. The method of claim 26, wherein the stabilizing additives consists essentially of sodium bicarbonate.

30. The methof of claim 26, wherein the an alkali metal bicarbonate is added in the finishing step as a concentrated aswueous solution.

31. The method of claim 26, wherein the halogenated rubber is isobutylene-bromomethylstyrene copolymer.

32. A method for making a halogenated isobutylene-p-methylstyrene rubber comprising the steps of halogenating the rubber in an organic solution to form a solution of halogenated rubber and hydrogen halide, neutralizing the hydrogen halide solution with an aqueous alkaline material, stripping the solvent from the neutralized solution to form a wet halogenated rubber crumb, dewatering the crumb to less than 20 weight percent water, and finishing the crumb with one or more stabilizing additives to obtain a halogenated isobutylene-p-methylstyrene product, wherein the stabilizing additives in the finishing step comprise from 15 to 10,000 ppm of a base having a pK value of greater than 6.

* * * * *